United States Patent [19]
Ryan

[11] Patent Number: 5,450,561
[45] Date of Patent: Sep. 12, 1995

[54] CACHE MISS PREDICTION METHOD AND APPARATUS FOR USE WITH A PAGED MAIN MEMORY IN A DATA PROCESSING SYSTEM

[75] Inventor: Charles P. Ryan, Phoenix, Ariz.

[73] Assignee: Bull HN Information Systems Inc., Billerica, Mass.

[21] Appl. No.: 921,825

[22] Filed: Jul. 29, 1992

[51] Int. Cl.[6] .............................................. G06F 12/02
[52] U.S. Cl. ............................. 395/403; 364/243.42; 364/964.22; 395/452; 395/411; 395/414
[58] Field of Search ... 364/200 MS File, 900 MS File; 395/400 MS File, 425 MS File

[56] References Cited

U.S. PATENT DOCUMENTS

| 5,023,776 | 6/1991 | Gregor ................................. 364/200 |
| 5,125,083 | 6/1992 | Fite et al. ............................ 395/375 |

FOREIGN PATENT DOCUMENTS 0402787 12/1990 European Pat. Off. .
8701482 3/1987 WIPO .

OTHER PUBLICATIONS

Patent Abstracts of Japan, vol. 011, No. 226 (p–598) 23 Jul. 1987; JP-A-62 040554 21 Feb. 1987.
European Search Report for corresponding EPO patent application 93103845, transmitted in a communication dated 02-06-1993.

Primary Examiner—Reba I. Elmore
Attorney, Agent, or Firm—J. S. Solakian; J. H. Phillips

[57] ABSTRACT

In a data processing system which employs a cache memory feature, a method and exemplary special purpose apparatus for practicing the method are disclosed to lower the cache miss ratio for called operands. Recent cache misses are stored in a first in, first out miss stack, and the stored addresses are searched for displacement patterns thereamong. Any detected pattern is then employed to predict a succeeding cache miss by prefetching from main memory the signal identified by the predictive address. The apparatus for performing this task is preferably hard wired for speed purposes and includes subtraction circuits for evaluating variously displaced addresses in the miss stack and comparator circuits for determining if the outputs from at least two subtraction circuits are the same indicating a pattern yielding information which can be combined with an address in the stack to develop a predictive address. The efficiency of the apparatus operating in an environment incorporating a paged main memory is improved, according to the invention, by the addition of logic circuitry which serves to inhibit prefetch if a page boundary would be encountered.

3 Claims, 3 Drawing Sheets

CACHE MISS PREDICTION METHOD AND APPARATUS FOR USE WITH A PAGED MAIN MEMORY IN A DATA PROCESSING SYSTEM

FIELD OF THE INVENTION

This invention relates to the art of data processing system central processors which include a cache memory feature and, more particularly, to a method and apparatus for selectively predicting memory cache misses for operand calls to a cache and using this information to transfer data from a paged main memory to cache memory to thereby raise the cache hit ratio.

BACKGROUND OF THE INVENTION

The technique of employing a high speed cache memory intermediate a processor and a main memory to hold a dynamic subset of the information in the main memory in order to speed up system operation is well known in the art. Briefly, the cache holds a dynamically variable collection of main memory information fragments selected and updated such that there is a good chance that the fragments will include instructions and/or data required by the processor in upcoming operations. If there is a cache "hit" on a given operation, the information is available to the processor much faster than if main memory had to be accessed to obtain the same information. Consequently, in many high performance data processing systems, the "cache miss ratio" is one of the major limitations on the system execution rate, and it should therefore be kept as low as possible.

The key to obtaining a low cache miss ratio is obviously one of carefully selecting the information to be placed in the cache from main memory at any given instant. There are several techniques for selecting blocks of instructions for transitory residence in the cache, and the more or less linear use of instructions in programming renders these techniques statistically effective. However, the selection of operand information to be resident in cache memory at a given instant has been much less effective and has been generally limited to transferring one or more contiguous blocks including a cache miss address. This approach only slightly lowers the cache miss ratio and is also an ineffective use of cache capacity.

Thus, those skilled in the art will understand that it would be highly desirable to provide means for selecting operand information for transitory storage in a cache memory in such a manner as to significantly lower the cache miss ratio. That end was accomplished in accordance with the invention disclosed and claimed in U.S. patent application Ser. No. 07/364,943 filed Jun. 12, 1989, for METHOD AND APPARATUS FOR PREDICTING ADDRESS OF A SUBSEQUENT CACHE REQUEST UPON ANALYZING ADDRESS PATTERNS STORED IN SEPARATE MISS STACK by Charles P. Ryan, now U.S. Pat. No. 5,093,777, by special purpose apparatus in the cache memory which stores recent cache misses and searches for operand patterns therein. Any detected operand pattern is then employed to anticipate a succeeding cache miss by prefetching from main memory the block containing the predicted cache miss.

The cache miss prediction circuit disclosed therein was best adapted to operate in an environment where the main memory address space is linear and unbroken. However, in many processors, the main memory address space is paged with the sizes of the pages typically falling within the range 1024–4096 bytes. In a paged main memory environment, the memory address developed during normal operation is a virtual address that must be translated from the virtual configuration to a physical configuration. This is typically achieved by dividing the address into two fields. Some lower number of bits, which represent addressing within a page, are not translated. All the remaining, upper bits are translated by a paging unit within the processor from the virtual address space to a physical address space in a manner which is invisible to the running program. The principal purpose of providing a paged main memory is to permit addressing a much larger virtual memory; however, secondary purposes of importance include the facilitation of providing security to selected main memory pages and the ability to continue operation if a page of main memory is faulty.

The method and apparatus disclosed in U.S. Pat. No. 5,093,777 has the drawback that it is subject to making invalid predictions or a prediction that may cause a system problem when a page boundary in main memory is crossed since operation is with physical addresses. For example, a pattern which continues onto the next page of the physical main memory may enter memory space which is reserved to some other user (or even confidential) or process, or the next page may be damaged and not intended for use, or it may contain information which is of no value to have in the cache at the present time. If the prediction process carries across a page boundary into a reserved or damaged area of memory, the processor must handle the resulting invalid states before normal processing can continue, and such remedial action may impose a severe performance penalty. The present invention overcomes this inherent drawback of the prior art method and apparatus when used in a paged main memory system.

OBJECTS OF THE INVENTION

It is therefore a broad object of this invention to provide an improved cache memory in a data processing system.

It is another object of this invention to provide a cache memory particularly characterized by exhibiting a lower cache miss ratio in operation when operand blocks are being requested.

It is a more specific object of this invention to provide a cache memory incorporating cache miss prediction method and apparatus which includes a feature for preventing invalid and troublesome cache miss predictions in a system environment incorporating a paged main memory.

SUMMARY OF THE INVENTION

Briefly, these and other objects of the invention are achieved by special purpose apparatus which stores recent cache misses and searches for address patterns therein. Any detected pattern is then employed to anticipate a succeeding cache miss by prefetching from main memory the block containing the predicted cache miss. The efficiency of the apparatus operating in an environment incorporating a paged main memory is improved, according to the invention, by the addition of logic circuitry which serves to inhibit prefetch if a paged boundary would be encountered.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION OF THE INVENTION

Figure 1:
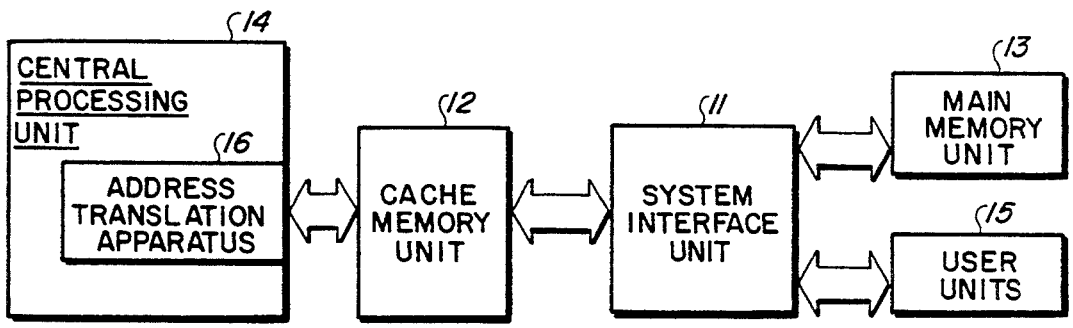
FIG. 1 is a generalized block diagram of a typical data processing system employing a cache memory and therefore constituting an exemplary environment for practicing the invention.

Referring now to FIG. 1, there is shown a high level block diagram for a data processing system incorporating a cache memory feature. Those skilled in the art will appreciate that this block diagram is only exemplary and that many variations on it are employed in practice. Its function is merely to provide a context for discussing the subject invention. Thus, the illustrative data processing system includes a main memory unit 13 which stores the data signal groups (i.e., information words, including instructions and operands) required by a central processing unit 14 to execute the desired procedures. Signal groups with an enhanced probability for requirement by the central processing unit 14 in the near term are transferred from the main memory unit 13 (or a user unit 15) through a system interface unit 11 to a cache memory unit 12. (Those skilled in the art will understand that, in some data processing system architectures, the signal groups are transferred over a system bus, thereby requiring an interface unit for each component interacting with the system bus.) The signal groups are stored in the cache memory unit 12 until requested by the central processing unit 14. To retrieve the correct signal group, address translation apparatus 16 is typically incorporated to convert a virtual address (used by the central processing unit 14 to identify the signal group to be fetched) to the real address used for that signal group by the remainder of the data processing system to identify the signal group.

The information stored transiently in the cache memory unit 14 may include both instructions and operands stored in separate sections or stored homogeneously. Preferably, in the practice of the present invention, instructions and operands are stored in separate (at least in the sense that they do not have commingled addresses) memory sections in the cache memory unit 14 inasmuch as it is intended to invoke the operation of the present invention as to operand information only.

The cache miss prediction mechanism which is an aspect of the invention is based on recognizing and taking advantage of sensed patterns in cache misses resulting from operand calls. In an extremely elementary example, consider a sensed pattern in which three consecutive misses ABC are, in fact, successive operand addresses with D being the next successive address. This might take place, merely by way of example, in a data manipulation process calling for successively accessing successive rows in a single column of data. If this pattern is sensed, the likelihood that signal group D will also be accessed, and soon, is enhanced such that its prefetching into the cache memory unit 14 is in order.

Figure 2:
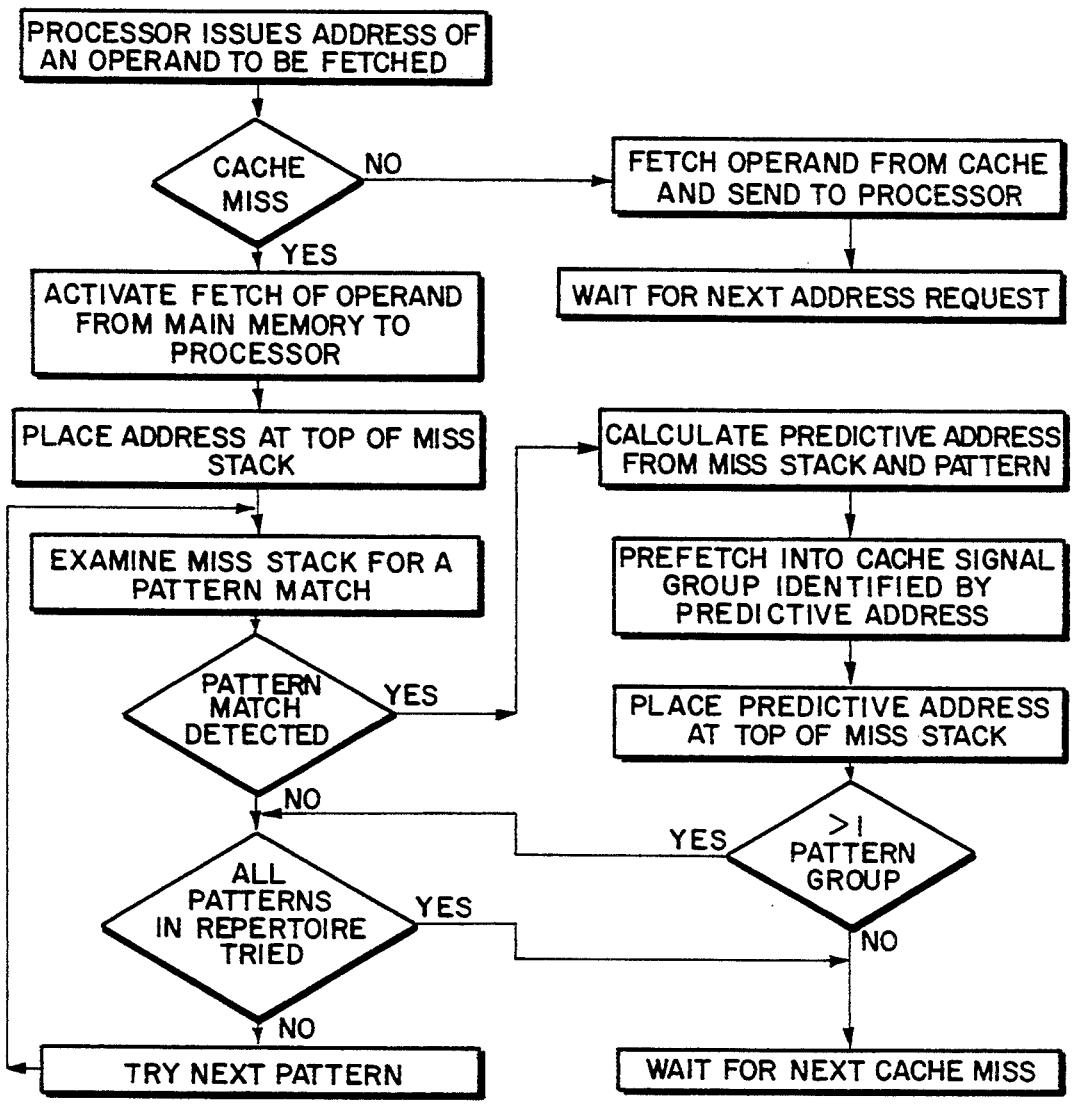
FIG. 2 is a flow diagram illustrating, in simplified form, the basic sequence of operations of a prior art cache miss prediction apparatus.

The fundamental principles of the cache miss prediction mechanism are set forth in the operational flow chart of FIG. 2. When a processor (or other system unit) asks for an operand, a determination is made as to whether or not the operand is currently resident in the cache. If so, there is a cache hit (i.e., no cache miss), the operand is sent to the requesting system unit and the next operand request is awaited. However, if there is a cache miss, the request is, in effect, redirected to the (much slower) main memory.

Those skilled in the art will understand that the description to this point of FIG. 2 describes cache memory operation generally. In the context of the present invention, however, the address of the cache miss is meaningful. It is therefore placed at the top of a miss stack to be described in further detail below. The miss stack (which contains a history of the addresses of recent cache misses in consecutive order) is then examined to determine if a first of several patterns is present. This first pattern might be, merely by way of example, contiguous addresses for the recent cache misses. If the first pattern is not sensed, additional patterns are tried. Merely by way of example again, a second pattern might be recent cache misses calling for successive addresses situated two locations apart. So long as there is no pattern match, the process continues through the pattern repertoire. If there is no match when all patterns in the repertoire have been examined, the next cache miss is awaited to institute the process anew.

However, if a pattern in the repertoire is detected, a predictive address is calculated from the information in the miss stack and from the sensed pattern. This predictive address is then employed to prefetch from main memory into cache the signal group identified by the predictive address. In the elementary example previously given, if a pattern is sensed in which consecutive operand cache miss operand addresses ABC are consecutive and contiguous, the value of the predictive address, D, will be C+1.

In order to optimize the statistical integrity of the miss stack, the predictive address itself may be placed at the top of the stack since it would (highly probably) itself have been the subject of a cache miss if it had not been prefetched in accordance with the invention.

Since speed of operation is essential, the cache miss prediction mechanism may advantageously be embodied in a "hard wired" form (e.g., in a gate array) although firmware control is contemplated. Consider first a relatively simple hardwired implementation shown in FIG. 3. A miss stack 20 holds the sixteen most recent cache miss addresses, the oldest being identified as address P with entry onto the stack being made at the top. Four four-input electronic switches 21, 22, 23, 24 are driven in concert by a shift pattern signal via line 25 such that: in a first state, addresses A, B, C, D appear at to respective outputs of the switches; in a second state, addresses B, D, F, H appear at the outputs; in a third state, addresses C, F, I, L appear at the outputs; and in a fourth state, addresses D, H, L, P appear at the outputs. Subtraction circuits 26, 27, 28 are connected to receive as inputs the respective outputs of the electronic switches 21, 22, 23, 24 such that: the output from the subtraction circuit 26 is the output of the switch 21 minus the output of the switch 22; the output from the subtraction circuit 27 is the output of the switch 22 minus the output of the switch 23; and the output from the subtraction circuit 28 is the output of the switch 23 minus the output of the switch 24.

The output from the subtraction circuit 26 is applied to one input of an adder circuit 31 which has its other input driven by the output of the electronic switch 21. In addition, the output from the subtraction circuit 26 is also applied to one input of a comparator circuit 29. The output from the subtraction circuit 27 is applied to the other input of the comparator circuit 29 and also to one input of another comparator circuit 30 which has its other input driven by the output of the subtraction circuit 28. The outputs from the comparator circuits 29, 30 are applied, respectively, to the two inputs of an AND-gate 32 which selectively issues a prefetch enable signal.

Figure 3:
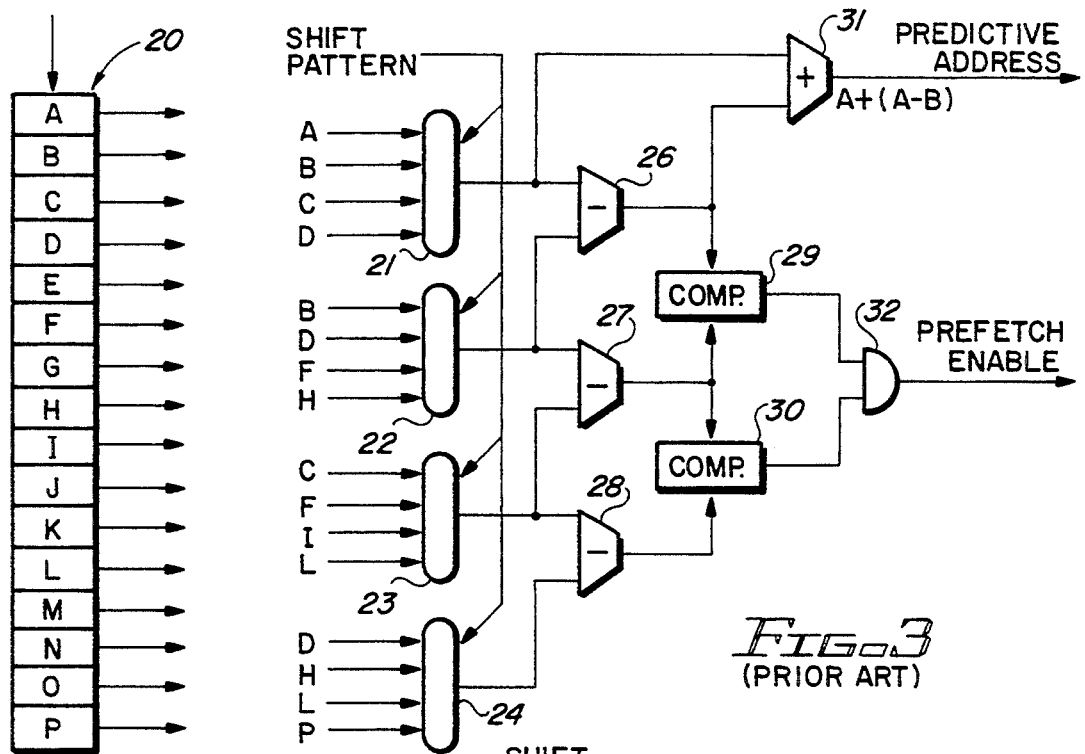
FIG. 3 is a logic diagram of a simple exemplary embodiment of the prior art cache miss prediction apparatus.

Consider now the operation of the circuit shown in FIG. 3. As previously noted, miss stack 20 holds the last sixteen cache miss addresses, address A being the most recent. When the request for the signal group identified by address A results in a cache miss, circuit operation is instituted to search for a pattern among the addresses resident in the miss stack. The electronic switches 21, 22, 23, 24 are at their first state such that address A is passed through to the output of switch 21, address B appears at the output of switch 22, address C appears at the output of switch 23 and address D appears at the output of switch 24. If the differences between A and B, B and C, and C and D are not all equal, not all the outputs from the subtraction circuits 26, 27, 28 will be equal such that one or both the comparator circuits 29, 30 will issue a no compare; and AND-gate 32 will not be enabled, thus indicating a "no pattern match found" condition.

The switches are then advanced to their second state in which addresses B, D, F, H appear at their respective outputs. Assume now that $(B-D)=(D-F)=(F+H)$; i.e., a sequential pattern has been sensed in the address displacements. Consequently, both the comparators 29, 30 will issue compare signals to fully enable the AND-gate 32 and produce a prefetch enable signal. Simultaneously, the output from the adder circuit 31 will be the predictive address $(B+(B-D))$. It will be seen that this predictive address extends the sensed pattern and thus increases the probability that the prefetched signal group will be requested by the processor, thereby lowering the cache miss ratio.

If a pattern had not have been sensed in the address combination BDFH, the electronic switches would have been advanced to their next state to examine the address combination CFIL and then on to the address combination DHLP if necessary. If no pattern was sensed, the circuit would await the next cache miss which will place a new entry at the top of the miss stack and push address P out the bottom of the stack before the pattern match search is again instituted.

Figure 4:
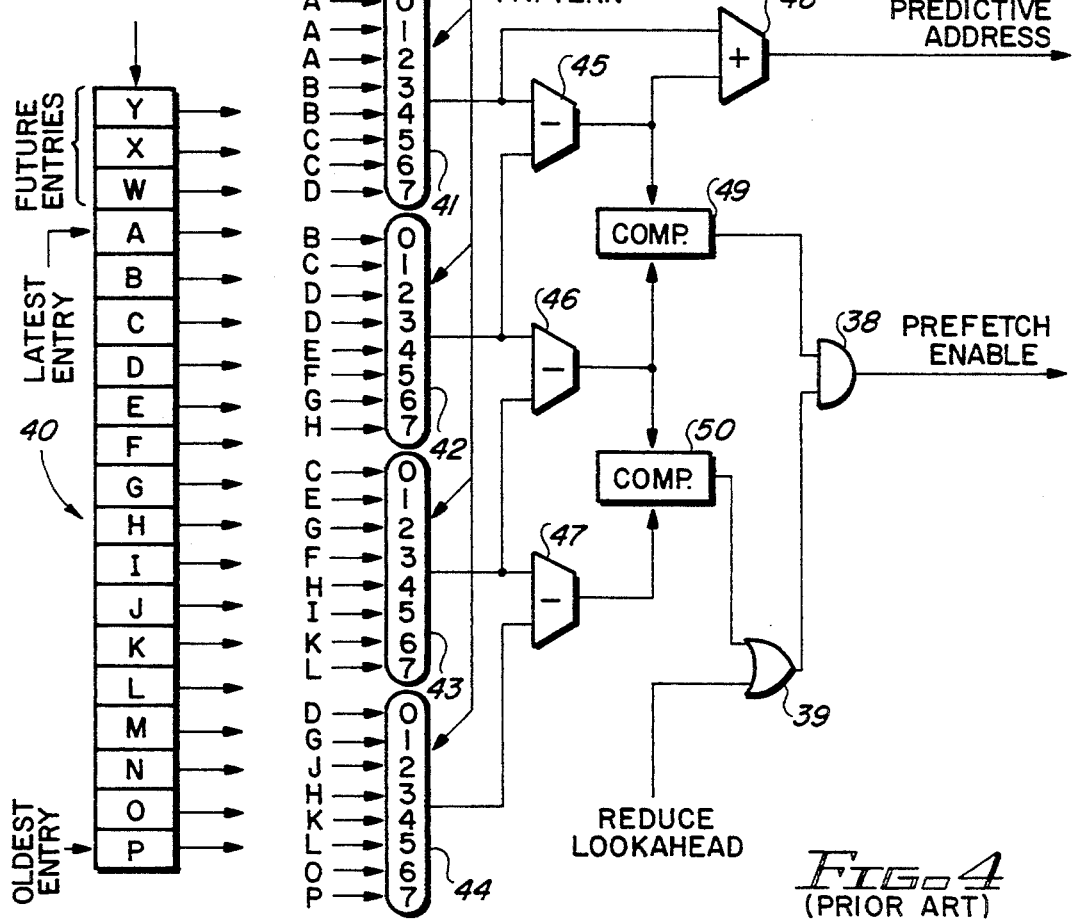
FIG. 4 is a logic diagram of a more powerful exemplary embodiment of the prior art cache miss prediction apparatus.

Consider now the somewhat more complex and powerful embodiment of the cache miss prediction mechanism illustrated in FIG. 4. Electronic switches 41, 42, 43, 44 receive at their respective inputs recent cache miss addresses as stored in the miss stack 40 in the exemplary arrangement shown. It will be noted that each of the electronic switches 41, 42, 43, 44 has eight inputs which can be sequentially selectively transferred to the single outputs under the influence of the shift pattern signal. It will also be noted that the miss stack 40 stores, in addition to the sixteen latest cache miss addresses A-P, three future entries WXY. Subtraction circuits 45, 46, 47 perform the same office as the corresponding subtraction circuits 26, 27, 28 of the FIG. 3 embodiment previously described. Similarly, adder circuit 48 corresponds to the adder circuit 31 previously described.

Comparator circuit 49 receives the respective outputs of the subtraction circuits 45, 46, and its output is applied to one input of an AND-gate 38 which selectively issues the prefetch enable signal. Comparator circuit 50 receives the respective outputs of the subtraction circuits 46, 47, but, unlike its counterpart comparator 30 of the FIG. 3 embodiment, its output is applied to one input of an OR-gate 39 which has its other input driven by a reduce lookahead signal. The output of OR-gate 39 is coupled to the other input of AND-gate 38. With this arrangement, activation of the reduce lookahead signal enables OR-Gate 39 and partially enables AND-gate 38. The effect of applying the reduce lookahead signal is to compare only the outputs of the subtraction circuits 45, 46 in the comparator circuit 49 such that a compare fully enables the AND-gate 38 to issue the prefetch enable signal. This mode of operation may be useful, for example, when the patterns seem to be changing every few cache misses, and it favors the most recent examples.

With the arrangement of FIG. 4, it is advantageous to try all the patterns within pattern groups (as represented by the "YES" response to the ">1 PATTERN GROUP?" query in the flow diagram of FIG. 2) even if there is a pattern match detected intermediate the process. This follows from the fact that more than one of the future entries WXY to the miss stack may be developed during a single pass through the pattern repertoire or even a subset of the pattern repertoire. With the specific implementation of FIG. 4 (which is only exemplary of many possible useful configurations), the following results are obtainable:

| SWITCH STATE | PATTERN | GOAL |
| --- | --- | --- |
| 0 | ABCD | W |
| 1 | ACEG | X |
| 2 | ADGJ | Y |
| 3 | BDFH | W |
| 4 | BEHK | X |
| 5 | CFIL | W |
| 6 | CGKO | X |
| 7 | DHLP | W |

The goal states are searched in groups by switch state; i.e.: Group 1 includes switch states 0, 1, 2 and could result in filling future entries WXY; Group 2 includes states 3, 4 and could result in filling entries WX; Group 3 includes states 5, 6 and could also result in filling entries WX; and Group 4 includes state 7 and could result in filling entry W. When a goal state is reached that has been predicted, the search is halted for the current cache miss; i.e., it would not be desirable to replace an already developed predictive address W with a different predictive address W.

Those skilled in the art will understand that the logic circuitry of FIGS. 3 and 4 is somewhat simplified since multiple binary digit information is presented as if it were single binary digit information. Thus, in practice, arrays of electronic switches, gates, etc. will actually be employed to handle the added dimension as may be necessary and entirely conventionally. Further, timing signals and logic for incorporating the cache miss prediction mechanism into a given data processing system environment will be those appropriate for that environment and will be the subject of straightforward logic design.

Figure 5:
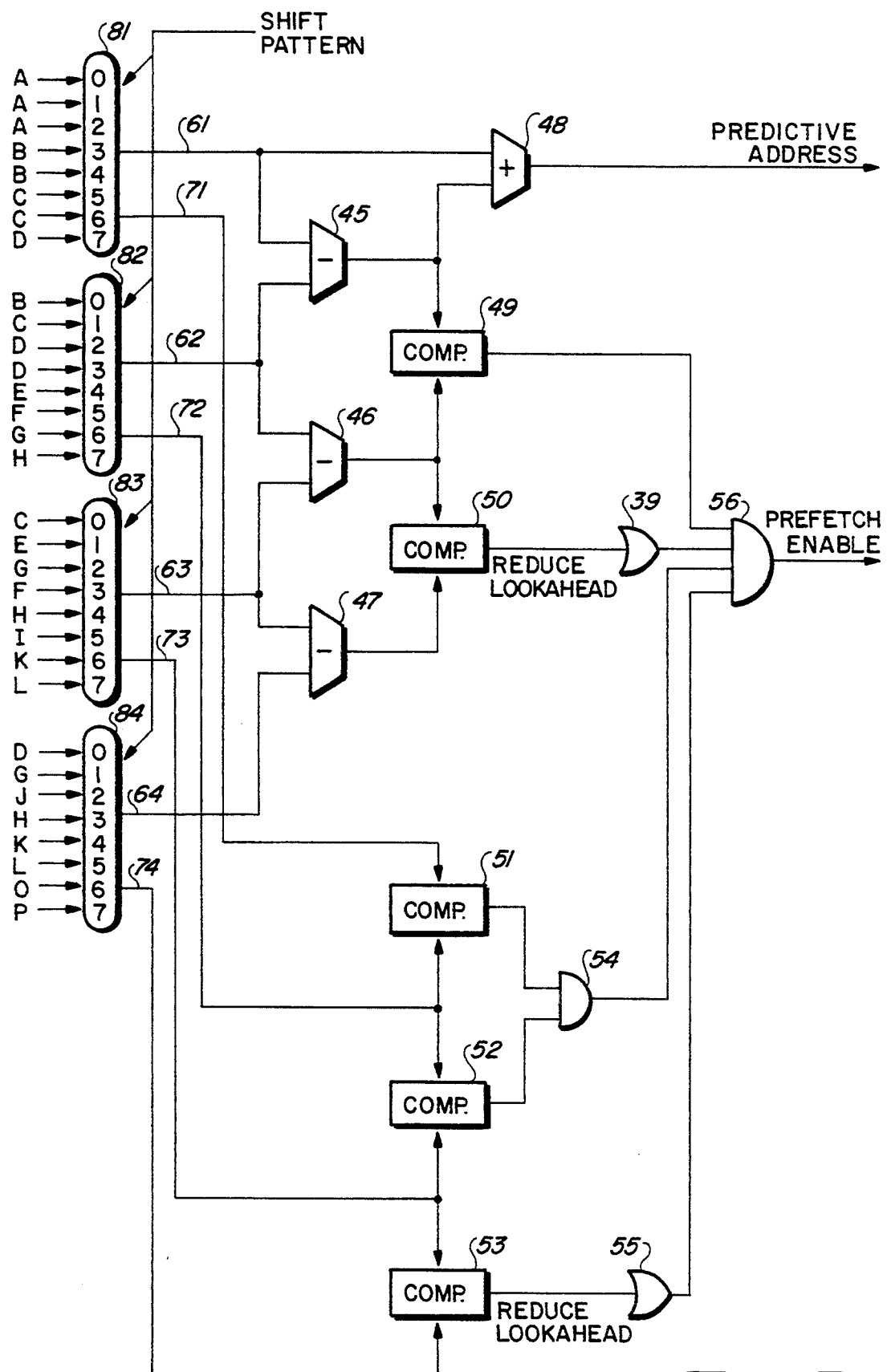
FIG. 5 is a logic diagram similar to FIG. 4 illustrating a cache miss prediction apparatus according to the present invention which is capable of efficient operation in a system environment incorporating a paged main memory.

The foregoing discussion relates to the invention disclosed and claimed in the above-referenced U.S. Pat. No. 5,093,777 which forms an exemplary environment for the present invention. Attention is now directed to FIG. 5 which is a simplified logic diagram illustrating the present invention as it is employed to improve the performance of the FIG. 4 circuitry when used with a paged main memory. It will be understood, of course, that the invention is equally applicable to the simpler circuitry illustrated in FIG. 3.

In a paged main memory environment, the address developed is a virtual address that must be translated from the virtual configuration to a physical configuration. This is often done by dividing the address into two fields. Some lower number of bits, which represent addressing within a page, are not translated. All the remaining upper bits are translated by a paging unit (not shown) within the processor from the virtual address space to a physical address space. This translation will have already been made in a conventional manner by the time the main memory addresses have been enter into the miss stack 40.

The electronic switches 81–84 correspond directly to the electronic switches 41–44 of FIG. 4 except that they split issued addresses into lower order and higher order portions. Subtraction circuits 45–47, comparator circuits 49, 50 and adder circuit 48 all perform essentially the same offices as previously described in conjunction with FIG. 4. However, it will be observed that only the lower order address portions issued by the electronic switches are supplied to the subtraction circuits and adder circuit on the lines 61–64. Merely by way of example, if a "page" of main memory is organized into 1024 blocks of memory, then the lowest order ten bits of address information from each of the electronic switches 41–44 are placed on the lines 61–64.

The higher order remainder of the address issued by the electronic switch 81 is applied as one input to comparator circuit 51 via line 71; the higher order remainder of the address issued by the electronic switch 82 is applied as one input to each of the comparator circuits 51 and 52 via line 72; the higher order remainder of the address issued by the electronic switch 83 is applied as one input to each of the comparator circuits 52 and 53 via line 73; and the higher order remainder of the address issued by the electronic switch 84 is applied as one input to comparator circuit 53 via line 74.

Therefore, if the higher order address portions from the electronic switches 81 and 82 are the same, the comparator circuit 51 will issue a compare signal; else, it will issue a no compare signal. Similarly, only if the higher order address portions from the electronic switches 82 and 83 are the same, the comparator circuit 52 will issue a compare signal; and only if the higher order address portions from the electronic switches 83 and 84 are the same, the comparator circuit 53 will issue a compare signal.

The comparators 51 and 52 drive an AND-gate 54 which will thus be enabled only if the higher order address portions from the electronic switches 81–83 are identical. The output from AND-gate 54 is applied as one input to a four-input AND-gate 56 which also receives inputs from the comparator circuit 49 and the OR-gate 39. The comparator 53 drives one input to an OR-gate 55 which has the reduce lookahead signal as its other input such that it will be enabled if either the comparator 53 issues a compare signal (indicating identity of the higher order address portions issued by the electronic switches 83 and 84) or the reduce lookahead signal is present. The output of the OR-gate 55 drives the final input to the AND-gate 56.

The AND-gate 56, only when fully enabled, issues the prefetch enable signal to the main memory which receives the predictive address from the adder circuit 48. Consider first the condition in which the reduce lookahead signal is not present such that neither of the OR-gates 39, 55 are enabled from that source. If the lower order address portions issued by adjacent ones of the electronic switches 81–84 all have equal differences as previously explained, the comparators 49 and 50 both issue compare signals which are applied to two inputs to the AND-gate 56, respectively, directly and through the OR-gate 39 in a manner similar to that described in conjunction with FIG. 4. This represents the address within a page of main memory. If the higher order address portions issued by the electronic switches 81–84 are identical, then the comparators 51–53 all issue compare signals, and the resulting outputs from the AND-gate 54 and OR-gate 55 serve to enable the remaining inputs to the AND-gate 56. This represents the address of a single page in main memory. Therefore, the AND-gate 56 is fully enabled and issues the prefetch enable signal to call the predicted block into cache.

If, however, the lower order address portions all match, but the higher order address portions do not indicating that a main memory page boundary condition has been encountered, one or more of the comparators 51–53 will issue a no compare signal to disable the AND-gate 56 and inhibit issuance of an invalid prefetch enable signal.

The reduce lookahead concept as described above in conjunction with FIG. 4 may also be employed in the present invention. The effect of applying the reduce lookahead signal to the OR-gate 55 is to compare only the higher order address portion outputs of the electronic switches 81–83 in the comparators 51 and 52 such that a compare fully enables the AND-gate 56 to issue the prefetch enable signal (assuming identity among the lower order address portions issued by the electronic switches 81–83). As previously discussed, this mode of operation may be useful when the patterns seem to be changing every few cache misses, and it favors the most recent examples.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In an operand cache miss prediction procedure for selectively predicting cache request addresses from historic operand cache miss addresses practiced in a data processing system incorporating a processor for running successive processes, a first in, first out miss stack for storing a plurality of operand cache miss addresses a paged main memory, and a cache memory for storing a plurality of blocks of information therein at a corresponding plurality of addresses and for supplying an information word group to said processor in response to a request therefrom supplying a word group address therefor, said addresses including higher order portions representing paged main memory page addresses and lower order portions representing addresses within a paged main memory page, the procedure comprising:

A) waiting for an occurrence of an operand cache miss resulting from an absence, in said cache memory, of called information stored at an address in and requested from said cache memory by said processor;
   B) when an operand cache miss condition occurs, placing said address of said called information onto said top cache miss address position;
   C) following step B):
      1) examining said first in, first out miss stack for a page boundary crossing among said higher order portions of operand cache miss addresses resident therein;
      2) if a page boundary crossing is detected in step C)1), returning to step B);
      3) examining said first in, first out miss stack for an address pattern among said lower order portions of operand cache miss addresses resident therein; and
      4) if a pattern is not matched in step C)1), returning to step A); and
   E) if no page boundary is detected in step C)1) and a pattern is matched in step C)2):
      1) using said matched pattern and at least one of said lower order address portions in said first in, first out miss stack to calculate a predictive address pointed to a signal group stored in said paged main memory;
      2) prefetching into cache memory from said paged main memory said signal group identified by said predictive address; and
      3) returning to step A).

2. In an operand cache miss prediction procedure for selectively predicting cache request addresses from historic operand cache miss addresses practiced in a data processing system incorporating a processor for running successive processes, a first in, first out miss stack for storing a plurality of operand cache miss addresses a paged main memory, and a cache memory for storing a plurality of blocks of information therein at a corresponding plurality of addresses and for supplying an information word group to said processor in response to a request therefrom supplying a word group address therefor, said addresses including higher order portions representing paged main memory page addresses and lower order portions representing addresses within a paged main memory page, the procedure comprising:

A) establishing a pattern repertoire comprising a plurality of operand address pattern groups:
   B) waiting for an occurrence of an operand cache miss resulting from an absence, in said cache memory, of called information stored at an address in and requested from said cache memory by said processor;
   C) when an operand cache miss condition occurs, placing said address of said called information onto said top cache miss address position;
   D) following step C):
      1) examining said first in, first out miss stack for a page boundary crossing among said higher order portions of operand cache miss addresses resident therein;
      2) if a page boundary crossing is detected in step D)1), returning to step B);
   E) selecting a current pattern group from said pattern repertoire;
   F) examining said lower order operand cache miss addresses resident in said first in, first out miss stack for a match with a selected address pattern in said current pattern group;
   F) if said selected pattern is not matched, determining if all the patterns in said current pattern group have been examined;
   G) if all patterns in said current pattern group have not been examined, selecting, from current pattern group, a different pattern than said selected pattern last examined and returning to step E);
   H) if all patterns in all said pattern groups in said pattern repertoire have been searched, returning to step A);
   I) if all patterns in said current pattern group have been examined, assigning a new pattern group, different from said current pattern group last examined, as said current group, selecting a pattern from said new current pattern group and returning to step E); and
   K) if said selected pattern is matched:
      1) using said matched pattern and at least one of said lower order address portions in said first in, first out miss stack to calculate a predictive address pointed to a signal group stored in said paged main memory;
      2) prefetching into said cache memory from said paged main memory said signal group identified by said predictive address; and
      3) assigning another pattern group as the current pattern group and returning to step E).

3. In a data processing system including a processor for running successive processes, a cache memory, a paged main memory and an operand cache miss prediction mechanism for prefetching signal groups, each identified by an address, from said paged main memory into said cache memory in response to the coordinated presence of a predictive address and a prefetch enable signal, which operand cache miss prediction mechanism further comprises:

A) a first in, first out stack for storing a plurality of addresses representing operand cache misses;
   B) a plurality of electronic switch means each having a plurality of address inputs and a lower order address portion output representing an address within a page of said paged main memory and a higher order address portion output representing an address of a page in said paged main memory;
   C) means coupling said plurality of addresses stored in said first in, first out stack individually to said electronic switch means inputs in predetermined orders;

D) pattern search means for switching said plurality of electronic switch means to transfer said plurality of addresses applied to said plurality of electronic switch means inputs to said plurality of electronic switch means outputs to establish at said plurality of electronic switch means outputs predetermined combinations of said plurality of addresses;

E) at least two subtraction circuit means, each said subtraction circuit means being coupled to receive a unique pair of lower order address portions from said plurality of electronic switch means outputs and adapted to issue a displacement value representing the difference therebetween;

F) at least a first comparator circuit means coupled to receive a pair of outputs from a corresponding pair of said subtraction circuit means and responsive thereto for issuing a compare signal if there is a compare condition;

G) at least a second comparator circuit means coupled to receive a unique pair of higher order address portions from said plurality of electronic switch means outputs and adapted to issue a no page boundary crossing signal if there is a compare condition;

H) predictive address development means adapted to combine one of said lower order address portions appearing at one of said plurality of electronic switch means outputs and said displacement value appearing at one of said subtraction circuit means to obtain a predictive address; and I) means responsive to a simultaneous presence of said compare signal and said no page boundary crossing signal to issue a prefetch enable signal.

* * * * *